(12) United States Patent
Moulsley et al.

(10) Patent No.: US 10,044,422 B2
(45) Date of Patent: *Aug. 7, 2018

(54) ANTENNA CONFIGURATION FOR CO-OPERATIVE BEAMFORMING

(71) Applicant: KONINKLIJKE PHILIPS N.V., Eindhoven (NL)

(72) Inventors: Timothy James Moulsley, Caterham (GB); Choo Chiap Chiau, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/442,863

(22) Filed: Feb. 27, 2017

(65) Prior Publication Data

US 2017/0170886 A1    Jun. 15, 2017

Related U.S. Application Data

(63) Continuation of application No. 14/745,956, filed on Jun. 22, 2015, now Pat. No. 9,584,205, which is a
(Continued)

(30) Foreign Application Priority Data

Jun. 23, 2009   (EP) ..................................... 09163525

(51) Int. Cl.
*H04B 7/04*       (2017.01)
*H04B 7/0456*  (2017.01)
(Continued)

(52) U.S. Cl.
CPC ........... *H04B 7/0456* (2013.01); *H04B 7/024* (2013.01); *H04B 7/0417* (2013.01);
(Continued)

(58) Field of Classification Search
CPC .... H04B 7/0456; H04B 7/024; H04B 7/0617; H04L 5/0035; H04J 11/0053
See application file for complete search history.

(56) References Cited

U.S. PATENT DOCUMENTS 9,065,512 B2    6/2015   Moulsley et al.
2003/0043946 A1  3/2003   Kim et al.
(Continued)

FOREIGN PATENT DOCUMENTS

JP    2008109664 A    5/2008
JP    2008301494 A    12/2008
(Continued)

OTHER PUBLICATIONS

Love et al., "Grassmannian Beamforming for Multiple-Input Multiple-Output Wireless Systems", IEEE Transactions on Information Theory, vol. 49, No. 10, Oct. 2003, pp. 2735-2747.
(Continued)

*Primary Examiner* — Curtis Odom

(57) ABSTRACT

The present invention relates to a method for communicating in a network, the network comprising at least a first cell and a second cell including respectively a first primary station having a first antenna array dedicated to the first cell and a second primary station having a second antenna array dedicated to the second cell, for communicating with a plurality of secondary stations, the method comprising the step of
(a) providing with a co-operative beamforming transmission from the first and second primary stations to at least one first secondary station, wherein step (a) includes
(a1) the first secondary station signaling at least one channel matrix to at least one of the first and second primary stations, and
(Continued)

(a2) the first and second primary stations applying a precoding matrix across both the first antenna array and the second antenna array, and wherein the precoding matrix comprises a first vector for the first cell and a second vector for the second cell, the precoding matrix being based on the at least one channel matrix.

15 Claims, 2 Drawing Sheets

Related U.S. Application Data continuation of application No. 13/379,231, filed as application No. PCT/IB2010/052633 on Jun. 14, 2010, now Pat. No. 9,065,512.

(51) Int. Cl.
*H04B 7/0417* (2017.01)
*H04B 7/024* (2017.01)
*H04B 7/06* (2006.01)

(52) U.S. Cl.
CPC ......... *H04B 7/0486* (2013.01); *H04B 7/0617* (2013.01); *H04B 7/0632* (2013.01)

(56) References Cited

U.S. PATENT DOCUMENTS

2006/0120477 A1 6/2006 Shen et al.
2009/0016460 A1 1/2009 Hwang et al.
2010/0104033 A1* 4/2010 Gorokhov ............. H04L 1/0026 375/260
2010/0322176 A1* 12/2010 Chen ...................... H04B 7/024 370/329

FOREIGN PATENT DOCUMENTS

WO 2010048513 A2 4/2010
WO 2010061302 A2 6/2010

OTHER PUBLICATIONS

Philips: "Codebook Design Issues for CoMP", 3GPP TSG RAN WG1 Meeting #57bis, R1-092349, Los Angeles, USA, Jun. 29-Jul. 3, 2009, 3 Pages Documents.

Philips: "Multi-Cell Co-Operative Beamforming: Operation and Evaluation and TP for TR36.814", 3GPP TSG RAN WG1 Meeting #56, R1-090701, Athens, Greece, Feb. 9-13, 2009, 6 Pages Document.

Nortel: "LTE-A Downlink Multi-Site MIMO Cooperation", 3GPP TSG-RAN Working Group 1 Meeting #54B, R1-083870, Prague, Czech Republic, Sep.-Oct. 2008, 7 Page Document.

Sharp, "Further Considerations on MBSFN Precoding for DL CoMP", 3GPP TSG RAN WG1 Meeting #56BIS, R1-091133, 2009, p. 1-12.

* cited by examiner

ANTENNA CONFIGURATION FOR CO-OPERATIVE BEAMFORMING

CROSS-REFERENCE TO PRIOR APPLICATIONS

This application claims the benefit or priority of and describes relationships between the following applications: wherein this application is a continuation of U.S. patent application Ser. No. 14/745,956, filed Jun. 22, 2015, which is a continuation of U.S. patent application Ser. No. 13/379,231, filed Dec. 19, 2011, now U.S. Pat. No. 9,065,512, issued on Jun. 23, 2015 which is the National Stage of International Application No. PCT/IB2010/052633, filed Jun. 14, 2010, which claims the priority of foreign application EP09163525 filed Jun. 23, 2009, all of which are incorporated herein in whole by reference.

FIELD OF THE INVENTION

The present invention relates to a method of communication in a communication system like a mobile communication system, for example UMTS, LTE or LTE Advanced.

More specifically, the invention relates to a method of communication using cooperative beamforming, where the beamforming is obtained by using primary station antennas from different cells, and where pre-coding codebooks for co-operative beamforming between different cells are used.

BACKGROUND OF THE INVENTION

In order to achieve greater transmission rate, it has been proposed to use a cooperative beamforming, where a plurality of antennas from different cells are used to create at least one spatial stream towards a user terminal. In connection with the beamforming and MIMO techniques, a pre-coding is applied on the antennas by applying complex coefficients on the antennas, so that the gain and/or the phase of the transmitting antennas are modified. It may be nevertheless crucial to signal to the user terminal some information about the beamforming (e.g. so that the user terminal can derive a suitable phase reference for receiving the signal).

This can be done by means of predetermined codebooks, being a set of predetermined coefficients. An index of the selected codebook may be signalled for instance to the receiving station, so that a corresponding set of receiving coefficients is applied. Moreover, in order to provide feedback to the transmitting stations, the user terminal needs to indicate information about the channel, for example a preferred precoding vector. It is thus required that all this signalling is implemented in a clever way so that it does not create too much overhead, but it is still reliable and effective enough.

In systems such as UMTS and LTE, multi-antenna transmission/reception techniques variously described as, MIMO, precoding or beamforming are supported for transmissions from a single cell to a mobile terminal. Precoding codebooks are defined, which enable the User Equipment (UE) to report a preferred precoding index for downlink transmission.

The same codebook may be used to signal to a user equipment the precoding vector or matrix which is actually applied in the downlink by a base station. This may be viewed as a way of describing the channel coefficients. This enables the user equipment to derive an appropriate phase/amplitude reference signal from common pilot symbols for demodulation of downlink transmissions. Alternatively the pilot symbols may be precoded to form dedicated reference symbols and used directly as receiver phase reference.

Typically, the specification for systems like LTE makes use of the term "antenna port", which is effectively a virtual antenna which may be derived by a linear combination of signals from one or more physical antennas. For convenience, we use the term "antenna", but this could also be understood as "antenna port"

Multi-antenna techniques such as beamforming, using antennas from multiple cells or multiple sites, could be of interest in LTE. However, there is a need of specifying how codebooks should be defined for such cases so that the signalling may be simple but still effective.

SUMMARY OF THE INVENTION

It is an object of the present invention to provide with a method for providing codebooks that could be used for cooperative beamforming.

It is another object of the invention to provide with a method of signalling the precoding in a cooperative beamforming context, where a plurality of cells are cooperating.

In accordance with a first aspect of the invention, a method is proposed for communicating in a network, the network comprising at least a first cell and a second cell including respectively a first primary station having a first antenna array dedicated to the first cell and a second primary station having a second antenna array dedicated to the second cell, for communicating with a plurality of secondary stations, the method comprising the step of (a) providing with a co-operative beamforming transmission from the first and second primary stations to at least one first secondary station, wherein step (a) includes (a1) the first secondary station signaling at least one channel matrix to at least one of the first and second primary stations, and (a2) the first and second primary stations applying a precoding matrix across both the first antenna array and the second antenna array, and wherein the precoding matrix comprises a first vector for the first cell and a second vector for the second cell, the precoding matrix being based on the at least one channel matrix.

Thus, the precoding can be carried out and signalled with a precoding designed for single cell precoding. Since in an embodiment of the invention, the system may implement single cell MIMO along with the multi cell MIMO (or co-operative MIMO), this avoids using a special signalling, and enables to use the single cell signalling for both transmission modes.

In accordance with a second aspect of the invention, a first primary station is proposed having a first antenna array dedicated to a first cell of a network, the network further comprising at least a second cell including a second primary station having a second antenna array dedicated to the second cell, the first primary station comprising means for communicating with a plurality of secondary stations, the primary station further comprising means for collaborating with the second primary station for providing with a co-operative beamforming transmission from the first and second primary stations to at least one first secondary station, receiving means for receiving from the first secondary station a signaling of at least one channel matrix, and control means for applying a precoding matrix across the first antenna array, and wherein the precoding matrix comprises a first vector for the first cell and a second vector for the second cell, the precoding matrix being based on the at least one channel matrix.

In accordance with a third aspect of the invention, a secondary station is proposed comprising means for communicating in a network, the network comprising at least a first cell and a second cell including respectively a first primary station having a first antenna array dedicated to the first cell and a second primary station having a second antenna array dedicated to the second cell, for communicating with the secondary station, the secondary station comprising means for receiving a co-operative beamforming transmission from the first and second primary stations to at least one first secondary station, and for signaling at least one channel matrix to at least one of the first and second primary stations, the matrix being based on a codebook dedicated for the first cell and/or a codebook dedicated for the second cell.

In accordance with a fourth aspect of the invention, it is proposed a network comprising at least two primary station of the second aspect and at least one secondary station of the third aspect.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

The present invention relates to a cellular network comprising a plurality of cells. In each cell, a dedicated primary station, like an eNodeB in LTE, communicates with mobile terminals, like User Equipments, located within the considered cell. Each primary station may comprise a plurality of antennas dedicated to the considered cell, the antennas being arranged in an array. In order to carry out beamforming or MIMO communication, the gain/phase of each antenna is modified when the primary station is transmitting. This is called precoding, and which permits to create spatial beams or spatial data streams directed towards a predetermined secondary station for example.

In order to control the precoding, feedback may be needed from the secondary station. For example, channel quality is typically indicated by a channel quality indicator (CQI). This is typically indicates a data rate at which packet transmissions can be received with predetermined error probability.

Multi-antenna techniques such as beamforming, using antennas from multiple cells or multiple sites, are discussed (under the description of CoMP or Co-operative Multi-Point transmission). In such a case, a plurality of cells (typically two cells but could be more) are collaborating for creating a beam to one or more secondary stations. For instance, the same data streams are transmitted from antenna ports of different cells.

However, it is not clear how codebooks should be defined for such cases, and it is not clear how existing (or new) codebooks designed for single cell use should be adapted for multi-cell use. An additional problem is that if co-operative beamforming is applied to transmit data from multiple cells, then copies of the data are needed at each of the cooperating cells.

Therefore, it is investigated in accordance with the embodiments of this invention to provide with solutions for a simple and reliable signalling and precoding that could be used in co-operative multicell MIMO communications. In a first variant of these embodiments, it can be proposed to use codebooks designed for single cells to report the channel information for multiple cells, where a phase offset is indicated between pairs of codebook indices. Moreover, this could as well be still improved with the transmission from multiple cells to a mobile terminal based on the reported channel information where independent data streams are sent from different cells. This could be done under the assumption of the use of this method, and in such a case, the mobile terminal can compute a channel quality indication (CQI) for each stream. It is to be noted that these features might be implemented independently.

Figure 1:
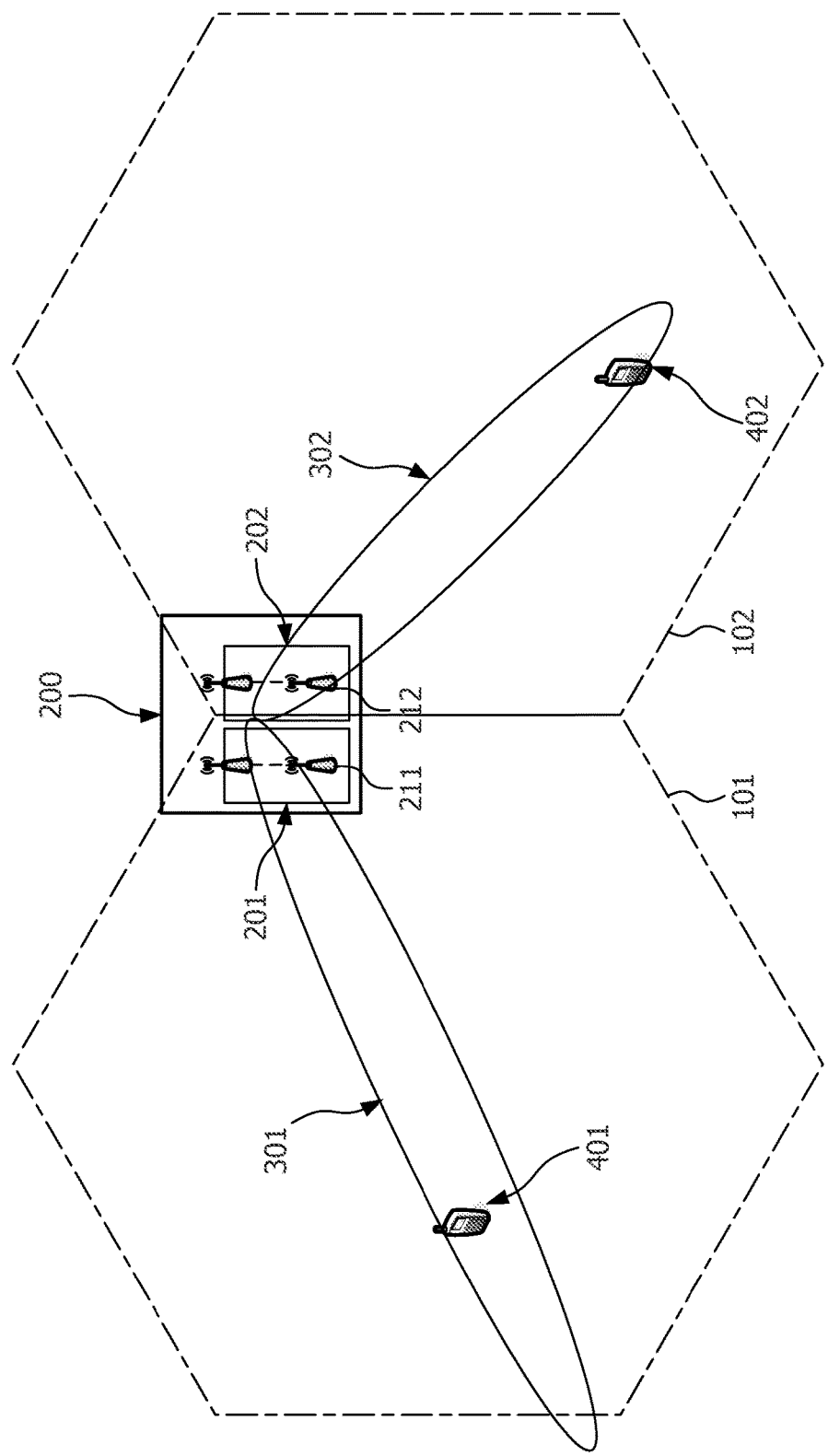
FIG. 1 is a block diagram representing a network in which is implemented a first embodiment of the invention.

In a first network illustrated on FIG. 1, a first cell 101 and a second cell 102 are neighboring. A base station 200 may comprise a first primary station 201 which antenna ports 211 are dedicated to the first cell 101 and a second primary station 202 which antenna ports 212 are dedicated to the second cell 102. In such a configuration, the same data can be easily transmitted by the first antenna ports 211 and the second antenna ports 212. A spatial stream 301 from the two cells is directed towards a secondary station 401 located in the first cell. Moreover, it is possible as shown to have another spatial stream 302 directed to another secondary station 402. In the illustrated example, the secondary station 402 is in the second cell, however, it could be located in the first cell as well.

In a first embodiment in a system like LTE, co-operative beamforming may be carried out between two cells in the downlink like illustrated in FIG. 1. The precoding is assumed to be carried out for each spatial stream by applying a precoding vector across the set of antennas belonging to both cells. The precoding vector is composed of a vector for each cell which is selected from a set of predetermined codebooks (one codebook for each of the first cell 101 and the second cell 102). The precoding is signalled for a spatial stream by indicating the precoding vector for each cell. An individual user, like the secondary stations 401 or 402 may receive one or more spatial streams 301 or 302 respectively. In order for the network to select appropriate precoding vectors, the mobile terminal provides feedback on the state of the channel(s). The feedback may take the form of a set of indices to preferred precoding vectors for each stream and each cell. These vectors are chosen to maximize the possible total transmission rate. The codebook(s) at the mobile terminal are the same as those in the network.

In a variation of this first embodiment, the codebooks are designed so that the coefficients applied to each antenna are defined with respect to the coefficients applied to one of the antennas, which acts as a reference. In LTE the first antenna is the reference and this antenna has a coefficient of unity. In order to fully define the required precoding across multiple cells using multiple codebooks (one for each cell) it may be necessary to specify the required phase/amplitude relationship between the codebooks. For LTE the codebook elements have unit magnitude, so the phase relationship could be specified as a phase rotation between one codebook and another (e.g. as a phase rotation between successive codebooks or with respect to a reference codebook). This phase offset could be specified with 2 or 3 bits to indicate one of 4 or 8 different phase offsets. In general, the phase value may be signalled in the uplink from the mobile terminal. In order to define a phase reference for receiving a signal from multiple cells, the phase offset can also be signalled in the downlink. It is to be noted that in the network illustrated on FIG. 1, the first primary station 201 and the second primary station 202 being in the same device, this permits to simplify the management of the phase offset, since this can be known by the base station 200. The use of the phase offset is however advantageous, as it facilitates the use of existing codebooks designed for single cell use. In an example of this embodiment, the reference codebook is chosen as the primary station in which is located the user equipment. As a consequence, the reference codebook for the secondary station 401 would be cell 101's codebook and the reference for the secondary station 402 would be cell 102's codebook.

Figure 2:
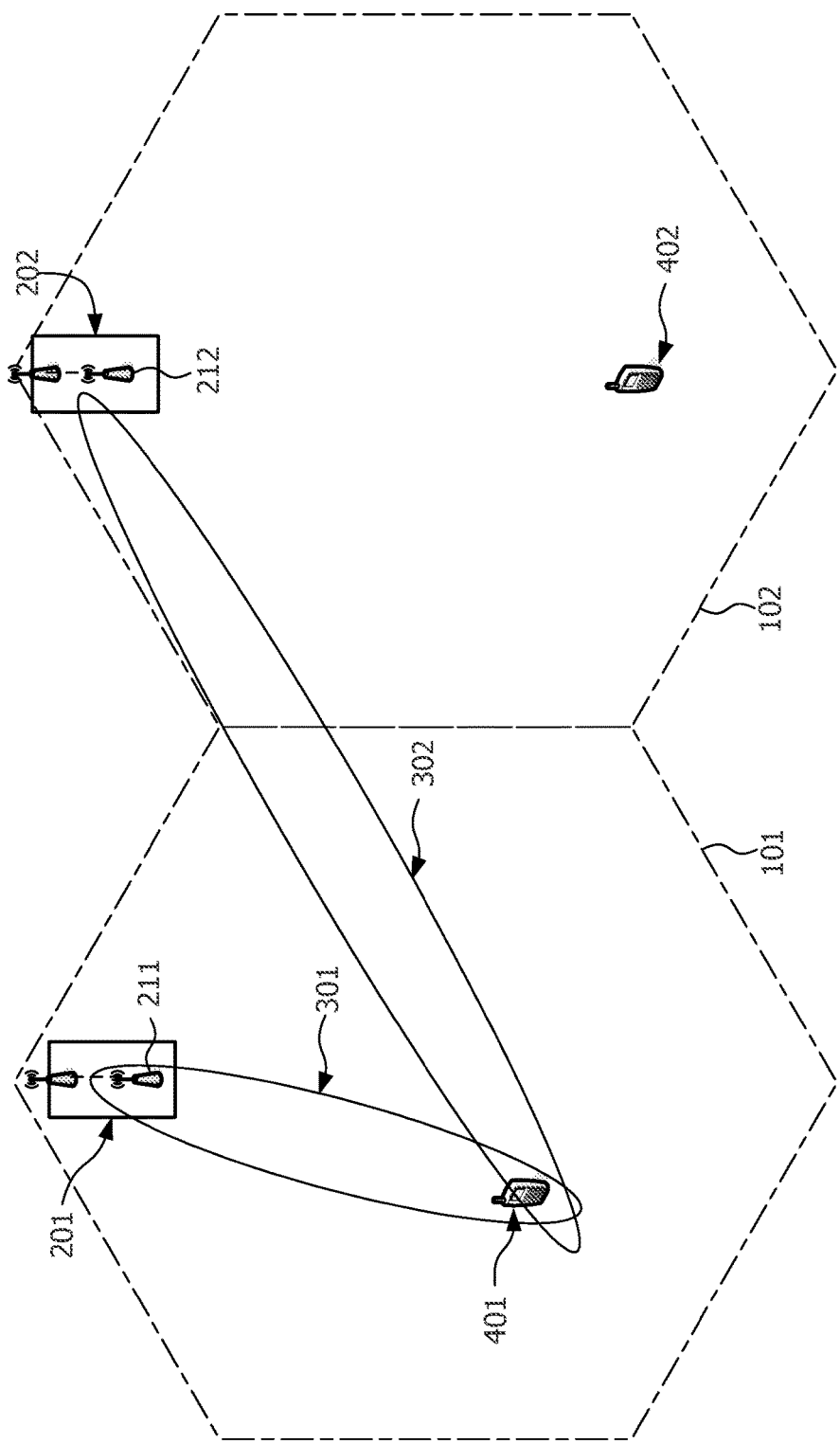
FIG. 2 is a block diagram representing a network in which is implemented a first embodiment of the invention.

In a variant of the first embodiment, the network can be somewhat different as illustrated on FIG. 2. In this case, the first primary station 201 of the first cell 101 may be in a different device than the second primary station 202 of the second cell 102. Thus, it is a bit more difficult to synchronise and to transmit the same data simultaneously. Moreover, the estimation of the phase offset may be more difficult than in a network illustrated on FIG. 1. However, it is still possible to implement the first embodiment in such a network, especially in the case of a femto-cells for example.

It is however to be noted that the network of FIG. 2 is more adapted to the implementation of the second embodiment of the invention. In accordance, with the second embodiment, the precoding in the primary stations comprises applying a precoding matrix across the first antenna array or the second antenna array. Moreover, the precoding matrix comprises a first vector for the first cell or a second vector for the second cell.

In the second embodiment implemented in a system like LTE, co-operative transmission may be carried out between two cells in the downlink. The precoding is assumed to be carried out for each spatial stream by applying a precoding vector across the set of antennas belonging to only one cell. The precoding vector for each cell is selected from a set of predetermined codebooks (one codebook for cell). The precoding is signalled for a spatial stream by indicating the precoding vector for each cell. An individual user may receive one or more spatial streams from each cell. In order for the network to select appropriate precoding vectors, the mobile terminal provides feedback on the state of the channel(s). The feedback takes to form of a set of indices to preferred precoding vectors for each stream and each cell. The set of precoding vectors are chosen to maximize the possible total transmission rate. The codebook(s) at the mobile terminal are the same as those in the network.

The second embodiment has the following advantages:
Different data can be transmitted from the different cells, which avoids the need to provide multiple copies of the same data in several cells.
Existing codebooks can be used without the need to indicate any phase offset
Scheduling decisions (e.g. transmission rate and power allocation) can be at least partly independent across the different cells. That is the reason why this second embodiment may be more adapted to the network illustrated on FIG. 2.

As an additional feature to the second embodiment, the signalling to indicate the downlink transmission of multiple streams to a user equipment from multiple cells could be similar to that used for multiple streams from a single cell (i.e. PDCCH in LTE). In general an indication would be needed to the user equipment of which was the appropriate reference signal to receive a given stream. If the reference is provided by means of precoded reference symbols, then it may not be necessary to indicate from which cell the stream is transmitted, but only which reference symbols (or reference sequence) should be used.

Moreover, some variants that could apply to the first embodiment and the second embodiment may comprise the following.

The phase reference(s) is indicated in the downlink using precoded reference symbols or precoded pilot symbols. Thus, the reference symbols may be used to carry information, and are not just used for the sake of synchronisation or likewise.

Moreover, it is to be noted that in the description, the expression of precoding vectors was used, although in some variant of the invention, the precoding can be represented with the help of precoding matrices.

As an additional feature, the user equipment computes the channel quality indicator (CQI) for each spatial stream, under the assumption of a selected number of spatial streams, and under the assumption of the use of a selected codebook entry for each cell. The CQI is signalled to the network and it enables the network to select an appropriate transmission rate (e.g. modulation and coding scheme).

Additional feedback may be provided to indicate alternative sets of precoding vectors (and CQI) which do not necessarily maximise the total rate. For example there could be a set of feedback computed for each possible number of spatial streams. Feedback could be provided for different assumptions about the interference from other transmissions to other terminals (e.g. in the second embodiment, that the cells are both sending streams to the same user equipment, or one cell is not transmitting, or the cells not co-operating in which there would be interference).

It is to be noted that the feedback could comprise a quantized representation of the channel instead of an index to a precoding vector.

Moreover, the feedback may indicate preferred transmission rank (which is in fact a preferred number of spatial streams).

In neither embodiment is it necessary that the number of antennas is the same in the co-operating cells.

The invention is applicable to systems using co-operative beamforming between cells which may include LTE-Advanced. The cells may be located a single base station site, or on different sites, for example femto-cells implemented by fiber radio techniques.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication.

The invention claimed is:

1. A method of operating a first primary station for communicating in a network, having a secondary station and a second primary station with a second antenna array dedicated to a second cell, for communicating with the secondary station, the method comprising:

in the first primary station:
(a) transmitting a single beamforming transmission contributed to by both the first primary station cooperatively together with a different second primary station, to at least one first secondary station, wherein the transmitting includes:
(a1) a secondary station signaling in at least one channel matrix to at least one of the first and a second primary stations, and
(a2) the first primary station applying a first vector of a precoding matrix across a first antenna array dedicated to a first cell, while the second primary station applies a second vector of the precoding matrix to a second antenna array of the second primary station, and
wherein the precoding matrix comprises the first vector for the first cell and the second vector for the second cell,
the precoding matrix being based on the at least one channel matrix,
one of the first vector and the second vector acting as a reference vector from which a phase difference between the other of the first vector and the second vector is determined with respect to the reference vector.

2. The method of claim 1, wherein the first vector and the second vector are selected respectively from a first codebook dedicated to the first cell and from a second codebook dedicated for the second cell.

3. The method of claim 2, wherein step (a1) comprises signaling a phase relationship between the first vector and a second vector.

4. The method of claim 1, wherein a phase reference is signaled to a secondary station by means of a precoded reference symbol.

5. The method of claim 1, wherein the precoding matrix is a vector.

6. The method of claim 1, wherein the first secondary station signals for at least one spatial stream, a channel quality information for at least one of the first cell and the second cell.

7. The method of claim 6, wherein the channel quality information further comprises at least one alternative preferred precoding vector, and wherein at least one of the first primary station and the second primary station selects one of: the preferred precoding vector or the alternative vector depending on an interference measurement.

8. The method of claim 7, wherein the channel quality information is representative of the channel conditions.

9. The method of claim 6, wherein the channel quality information includes a preferred transmission rank.

10. The method of claim 1, wherein the at least one channel matrix comprises one of:
a preferred precoding vector selected by the secondary station from a codebook; and
a quantized representation of the transmission channel between one of the first and second primary stations and the secondary station.

11. The method of claim 1, wherein the preferred precoding vector is selected to indicate one of:
The precoding vector that would provide the highest received data rate;
The precoding vector that would provide the highest received SNR,
when used for transmission by one of the first primary station or the second primary station.

12. A first primary station for communicating in a network with a second primary station having a second antenna array dedicated to a second cell and a secondary stations, the first primary station comprising:
a first antenna array for dedication to a first cell for communicating in a network,
a processor of the first primary station controlling a transmitter to transmit through the first antenna array to communicate with the secondary station,
a processor controlling the transmitter and configuration of the antenna,
while the processor of the first primary station collaborates with a processor of a second primary station for providing a single co-operative beamforming transmission contributed to by both the first and second primary stations to the secondary station,
a receiver for receiving from the secondary station a signaling of at least one channel matrix, and
the processor of the first primary station is configured to apply a precoding matrix across the first antenna array, and
wherein the precoding matrix comprises a first vector for the first cell and a second vector for the second cell, the precoding matrix being based on the at least one channel matrix,
one of the first vector and the second vector acting as a reference vector from which a phase difference between the other of the first vector and the second vector is determined with respect to the reference vector.

13. A secondary station
for communicating in a network with a first primary station including a first antenna array dedicated to a first cell, and a second primary station having a second antenna array dedicated to a second cell, the secondary station comprising:
an antenna array configured to transmit and receive in selected directions,
a transmitter configured to transmit through the antenna array,
a processor configured to control the transmitter and direction of the antenna array, and transmit through the transmitter and antenna, at least one channel matrix to at least one of the first and second primary stations,
a receiver configured to receive a single co-operative beamforming transmission through the antenna contributed to by both the first and second primary stations
the channel matrix being based on a codebook dedicated for at least one of: the first cell and the second cell,
one of a first vector of the channel matrix and a second vector of the channel matrix acting as a reference vector from which a phase difference between the other of the first vector and the second vector is determined with respect to the reference vector.

14. A first primary station for communicating in a network with a second primary station with a second antenna array dedicated to a second cell and a secondary station, the first primary station comprising:
a first antenna array configured for dedication to a first cell of a network,
a transmitter configured to transmit through the first antenna array,
a processor configured to control the transmitter and antenna direction to communicate through the transmitter and antenna array with a plurality of secondary stations, while the processor is configured to collaborate with a processor of the second primary station for providing a single co-operative beamforming transmission contributed to by both the first and second primary stations to the secondary station, a receiver for receiving from the secondary station a signaling of at least one channel matrix, and the processor is configured to apply a precoding matrix across the first antenna array, and the primary station receives from a secondary station, signals for at least one spatial stream, a channel quality information for at least one of the first cell and the second cell, and one of a first vector of the channel matrix and a second vector of the channel matrix acting as a reference vector from which a phase difference between the other of the first vector and the second vector is determined with respect to the reference vector.

15. A secondary station for communicating with a first primary station with a first antenna array dedicated to a first cell and a second primary station with a second antenna array dedicated to a second cell, the secondary station comprising:

an antenna;

a transmitter connected to the antenna;

a processor configured to control the transmitter to transmit through a first antenna array for communicating in a network, a receiver configured to receive a single co-operative beamforming transmission contributed to by both the first and second primary stations together, and for signaling at least one channel matrix to at least one of the first and second primary stations, the channel matrix being based on a codebook dedicated for at least one of: the first cell and the second cell, the secondary station signals for at least one spatial stream, a channel quality information for at least one of the first cell and the second cell, and one of a first vector of the channel matrix and a second vector of the channel matrix acting as a reference vector from which a phase difference between the other of the first vector and the second vector is determined with respect to the reference vector.

* * * * *